United States Patent
Zeh et al.

(10) Patent No.: US 12,512,967 B2
(45) Date of Patent: Dec. 30, 2025

(54) PROVIDING SECURE TRACE MESSAGE COMMUNICATIONS USING SYMMETRIC ENCRYPTION AND AUTHENTICATION

(71) Applicant: Infineon Technologies AG, Neubiberg (DE)

(72) Inventors: Alexander Zeh, Munich (DE); Gasper Skvarc Bozic, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 250 days.

(21) Appl. No.: 18/459,695

(22) Filed: Sep. 1, 2023

(65) Prior Publication Data

US 2025/0080325 A1 Mar. 6, 2025

(51) Int. Cl.
*H04L 9/08* (2006.01)
*H04L 9/06* (2006.01)

(52) U.S. Cl.
CPC .......... *H04L 9/0819* (2013.01); *H04L 9/0637* (2013.01); *H04L 9/0863* (2013.01)

(58) Field of Classification Search
None
See application file for complete search history.

(56) References Cited

U.S. PATENT DOCUMENTS

| | | | |
|---|---|---|---|
| 2013/0091353 A1* | 4/2013 | Zhang | H04L 9/3268 713/156 |
| 2019/0286549 A1* | 9/2019 | Mola | G06F 11/3636 |
| 2021/0303443 A1* | 9/2021 | Mcconnell | G06F 21/46 |

FOREIGN PATENT DOCUMENTS

GB 2587569 A * 3/2021 ............ H04L 63/10

OTHER PUBLICATIONS

M. J. Dworkin, "SP 800-38D. Recommendation for Block Cipher Modes of Operation: Galois/Counter Mode (GCM) and GMAC," National Institute of Standards & Technology, Gaithersburg, MD, United States, 2007. [Online]. Available: http://dx.doi.org/10.6028/NIST.SP.800-38D.
AURIX™ TC4xx debug and trace. Infineon Technologies AG, 2022.
E. Valea, M. D. Silva, M.-L. Flottes, G. D. Natale, and B. Rouzeyre, "Encryption-Based Secure JTAG," in 2019 IEEE 22nd International Symposium on Design and Diagnostics of Electronic Circuits & Systems (DDECS), Apr. 2019, pp. 1-6. doi: 10.1109/DDECS.2019.8724654.
K.-J. Lee, Z.-Y. Lu, and S.-C. Yeh, "A Secure JTAG Wrapper for SoC Testing and Debugging," IEEE Access, vol. 10, pp. 37603-37612, 2022, doi: 10.1109/ACCESS.2022.3164712.
J. Backer, D. Hely, and R. Karri, "Secure and Flexible Trace-Based Debugging of Systems-on-Chip," ACM Trans. Des. Autom. Electron. Syst., vol. 22, No. 2, p. 31:1-31:25, Dec. 2016, doi: 10.1145/2994601.

* cited by examiner

Primary Examiner — William J. Goodchild
(74) Attorney, Agent, or Firm — Banner & Witcoff, Ltd.

(57) ABSTRACT

The described techniques address issues associated with current implementations of debugging and tracing tools, which transmit trace data from tracing processes in an unencrypted form. The techniques include providing a secure means by which to convey the trace data instances outside of a monitored system utilizing an encryption scheme that leverages a number used only once (nonce) value for the encryption of the trace data instances. Advantageously, a time stamp value identified with one or more of the trace messages may be used to generate the nonce value to facilitate the encryption of the trace data instances.

21 Claims, 11 Drawing Sheets

```
START_OF_CODE_IN_TRACE
         31    28  27    24  23    20  19    16  15    12  11     8   7     4   3     0
C0A002EFC0  F8C20F1B  201E02B7  F4C8F07B  02480610  FFD9FF00  3091B03C  F9600F1B  F4B9907B
C0A002F040  036E2BC2  021BFE62  0F3724CB  F07BF04C  0630FED9  FFD03091  E23CF968  0F1BF4B9
C0A002F360  162E2806  8103F00F  4040016B  4040016B  0840A620  FFD9FF00  3091B000  0437006D
C0A002F380  0F608FA6  F0100FB7  B140208F  F04CA620  FFD9FF00  3091F68  0FA6F010  1F8FF04C
```

FIG. 8

PROVIDING SECURE TRACE MESSAGE COMMUNICATIONS USING SYMMETRIC ENCRYPTION AND AUTHENTICATION

TECHNICAL FIELD

The aspects described herein generally relate to the use of debugging and tracing systems and, more particularly, to the secure communication of trace data generated via such systems.

BACKGROUND

Debugging and tracing tools are commonly used throughout the development of product designs to identify issues with software and compatibility issues that may arise from the interoperability between executed software components and hardware components of a system. Debugging refers to the intrusive control and observation of system resources, whereas tracing refers to the non-intrusive observation of system resources. Debugging and tracing are typically performed via a tool that is configured for this purpose, such as a computing system configured with specially designed software. The computing system may facilitate debugging and tracing operations via communications with the relevant system components. However, conventional debugging and tracing approaches have various drawbacks, particularly with respect to the trace data that is exchanged during these processes being unencrypted. As a result, conventional debugging and tracing tools may be exploited to allow third parties to intercept or "snoop" trace data, which may be used as part of unauthorized reverse engineering attempts or other nefarious purposes.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

Figure 3A:
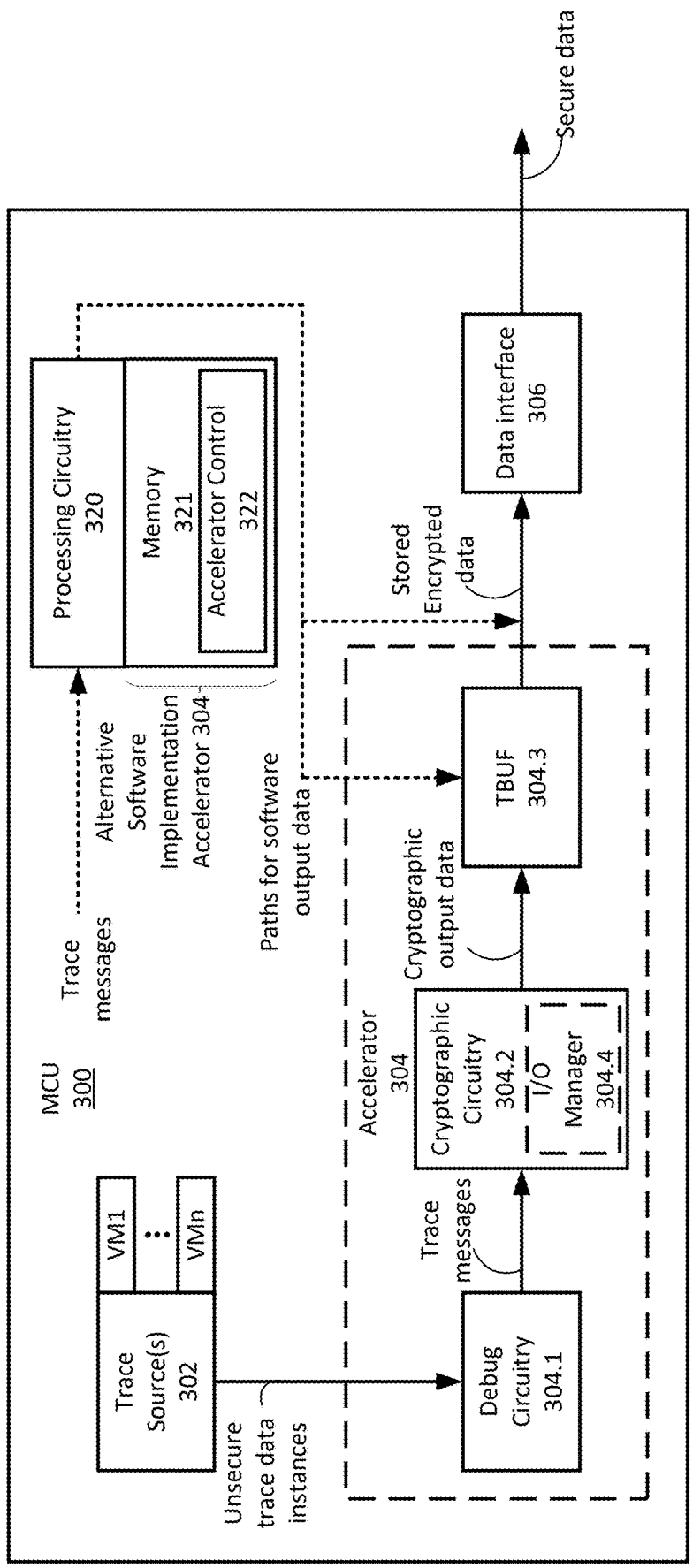
FIG. 3A illustrates a first example of a secure trace data architecture, in accordance with one or more embodiments of the present disclosure.
Figure 7:
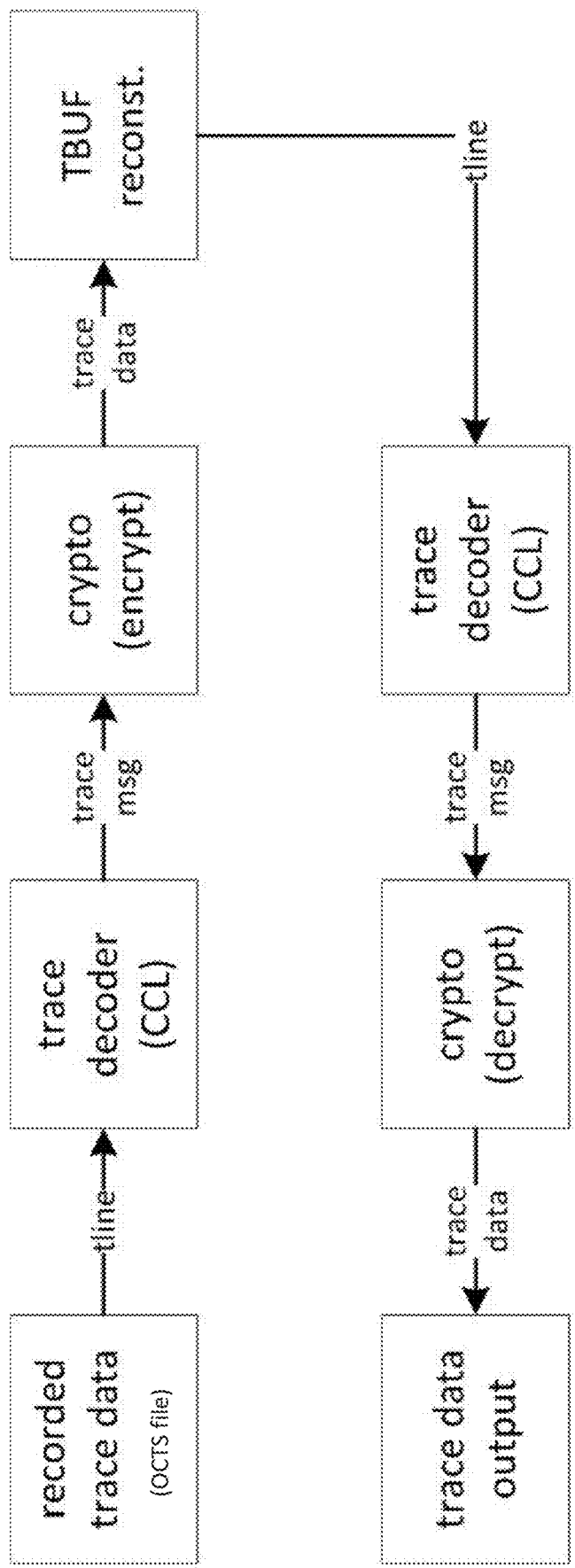

FIG. 7 illustrates an example demonstration of a software flow solution to realize the functionality of the accelerator of FIG. 3A, in accordance with one or more embodiments of the present disclosure; and FIG. 8 illustrates an example of recorded trace data that may be stored in a trace data buffer for the demonstrated software solution of FIG. 7, in accordance with one or more embodiments of the present disclosure.

The example aspects of the present disclosure will be described with reference to the accompanying drawings. The drawing in which an element first appears is typically indicated by the leftmost digit(s) in the corresponding reference number.

SUMMARY

Again, debugging and tracing tools are commonly used as part of product development. Debugging comprises an intrusive control and observation of system resources, which are typically associated with a chip (such as a microcontroller, a system on a chip (SoC), a central processing unit (CPU), virtual machines, etc.) having one or more processor cores. Thus, debugging processes may be used to change the operation of the observed system resource to isolate and rectify various issues. Tracing, on the other hand, refers to the passive observation of system resources without manipulating those resources. In other words, tracing refers to a monitoring process by which various system resources may be observed but not changed. The system resources in either case are typically identified with the execution flow of one or more processors that are monitored in this manner, such as the execution of various functions that may include the current value of an instruction pointer, data that is read and/or written in response to executed instructions, etc.

When tracing is performed, the system resources are monitored in this way using a communication interface that receives trace messages. These trace messages may contain various types of data and comply with a predetermined format or data structure, and include information that may be subsequently processed (typically via an external system such as the aforementioned tool) to facilitate system resource observation. For instance, the trace messages may contain trace data instances, an indication of the type of trace data, an identification of the trace data source such as a core identifier, a length parameter, a time tag parameter, time stamps, etc. The trace data instances comprise the information that is monitored with respect to the system resources, e.g. the execution of various functions as noted above.

However, current implementations of debugging and tracing tools may receive the trace messages, as well as the trace data instances contained therein, in an unencrypted form. And because the trace messages may comply with a known, predefined format, the trace data instances may be extracted from the trace messages with minimal skill. Because the trace data instances detail the inner functionality of the system resources of a particular product, this may pose a significant problem as this information may be used for reverse engineering attempts or other malicious purposes. Thus, the embodiments described herein address this issue by providing a secure means by which to convey the trace data instances or other data contained in the trace messages outside of the monitored system. To do so, the embodiments described herein may utilize an encryption scheme that leverages a number used only once (nonce) value for the encryption of trace data instances. Advantageously, the time stamp value, as well as additional or alternate information that may be present in the trace messages, may be used as a nonce value to facilitate this encryption process.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

I. Technology Overview: Debugging and Tracing Systems

Figure 1A:
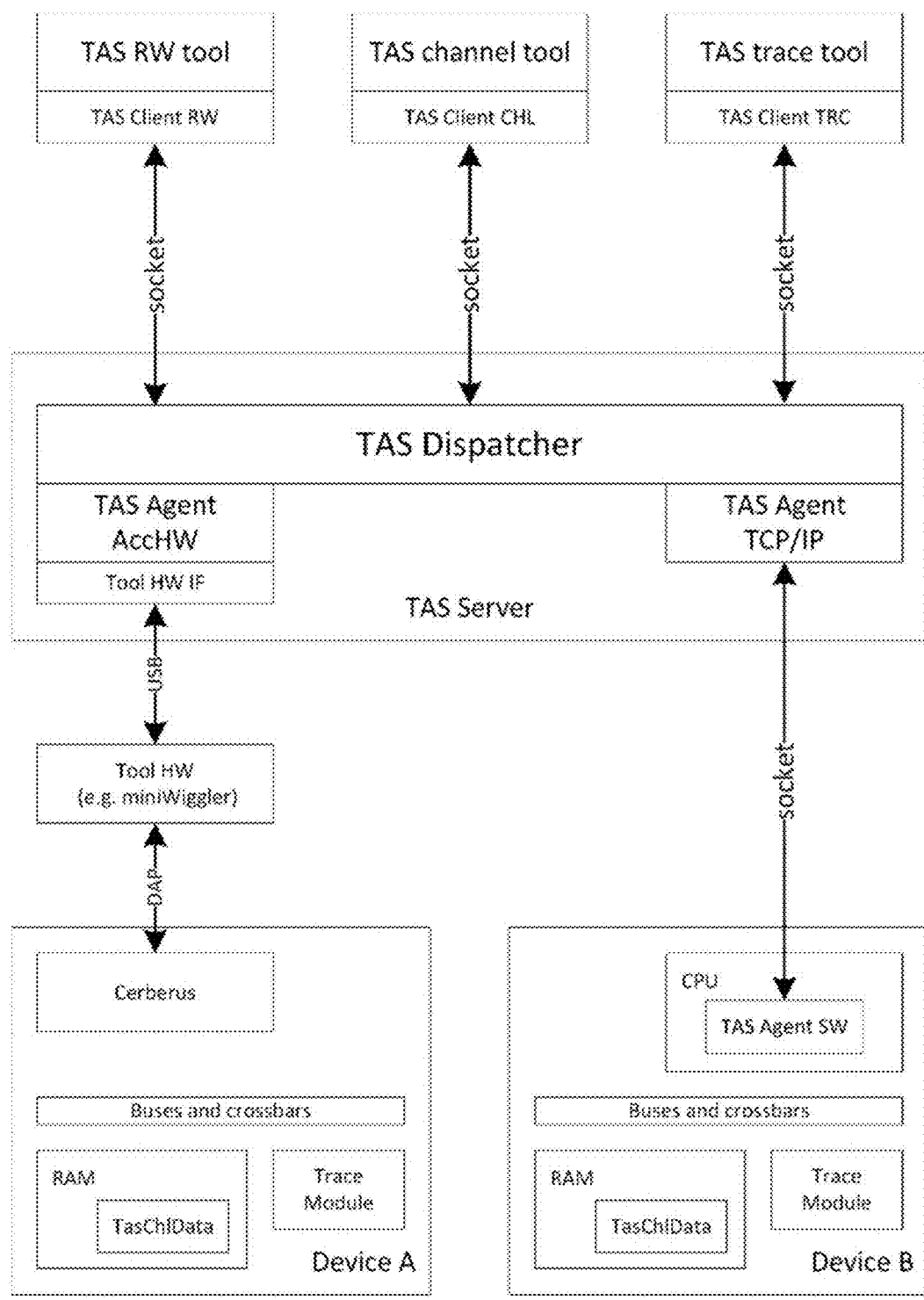
FIG. 1A illustrates a block diagram of a conventional debugging and tracing tool architecture.

FIG. 1A illustrates a block diagram of a debugging and tracing tool architecture, in accordance with various embodiments of the disclosure. With reference to FIG. 1A, the devices A and B may represent the devices from which the system resources are monitored by receiving trace messages, as discussed in further detail herein. The architecture 120 illustrates various examples of known interface configurations that may be implemented to facilitate different types of tools performing debugging and/or tracing with respect to the system resources of the devices A and B. The architecture 120 as shown in FIG. 1A may be implemented in accordance with the embodiments further discussed herein by further modifying the devices A and B to ensure secure communications of trace data. It is noted that the architecture 120 as shown in FIG. 1A is provided by way of example and not limitation, and the embodiments as further described herein may be implemented in accordance with any suitable type of architectures, including those known to be used for debugging and/or tracing.

Thus, the devices A and B may comprise any suitable type of devices that have system resources, which may be debugged and/or traced as discussed herein. For example, the devices A and B may comprise a microcontroller or other suitable device that may comprise a microcontroller, a CPU, a processor, one or more processor cores, etc. Access to the devices A and B may be performed in different ways, with the trace data instances being accessed by way of the host and device communications. For example, access to device A may be performed via a suitable tool HW. Alternatively, and as shown with respect to device B, access may be performed (e.g. in the field when a tool HW is unavailable) via an Ethernet connection.

To facilitate the generation of the trace data instances as further discussed herein, such systems typically have three primary components. The first of these components comprises a host system interface, which is alternatively referred to as a debug interface. The host system interface may comprise a data interface such as a device access port (DAP) as shown with respect to device A, which is configured to perform telegram-based communications with a cyclic redundancy check (CRC) of the particular system resources that is/are monitored. The host system interface may alternatively comprise a socket, as shown for the device B, which is likewise configured to perform communications of the system resources that is/are monitored via a predetermined communication protocol. That is, when a socket such as an Ethernet connection is implemented, the communication follows a predefined protocol.

The second component comprises a host controlled bus master, which may alternatively be referred to as a debug interface. This is represented in FIG. 1A as the Cerberus module for device A, and as the tool access (TAS) agent software for device B. The debug interface, in each case, represents a hardware or software solution, respectively, that interfaces with the respective host system interface as shown. The debug interface may be implemented as an on-chip module (e.g. hardware, software, or combinations of these) that controls all on-chip debug system (OCDS) functions. This may include the generation of trace data as discussed in further detail below. To do so, the debug interface is coupled to an internal bus on the device A or B, as the case may be, which enables access to the on-chip memory, peripherals, etc.

The third primary component comprises an observation block, which provides debugging and/or tracing support for the software running on the devices A and B, as the case may be. To do so, the observation block may be coupled directly or indirectly to a processing core, i.e. a CPU, a DMA (direct memory access) module, a bus system, etc. The observation block is configured to generate trace messages based on a predefined message format, with the configuration being provided via its configuration registers. The configuration of the observation block, i.e. the configuration provided to the configuration registers, may be performed via the host controlled bus master. In other words, the on-chip trace logic implemented by the observation block to perform this functionality is configured by writing values into its configuration registers, triggering the trace process, and then reading the trace data from the trace data buffer. Thus, although the observation block may facilitate both debugging and tracing functions by way of the configuration of the on-chip trace logic, the tracing functions are the primary focus of the embodiments as discussed herein, and thus the observation block is represented in FIG. 1A as a trace module for each of the devices A and B. However, it is noted that the embodiments as described in further detail herein may be applied to provide secure communications of any suitable type of data that is generated via debugging and/or tracing processes.

Therefore, given the ability to configure the on-chip trace logic implemented by the observation block, in most scenarios read/write access is sufficient, and the RW tool is commonly used to perform read and write functions with the observation block to obtain the trace data. However, it is noted that the architecture 120 as shown in FIG. 1A may in some scenarios comprise a client-server architecture, with the external debugger/tracer tool as noted above being implemented as one several different types of clients. With continued reference to FIG. 1A, the client types may comprise a read/write tool, a channel tool, or a trace tool.

Depending upon the type of debugging or tracing that is to be performed, any of the host devices (i.e. the RW tool, the channel tool, or the trace tool) may be implemented. For example, the channel tool may be used for communication with a target device's (i.e. device A or B) software, and may function as a substitute for a more conventional universal asynchronous receiver/transmitter (UART) interface, but may utilize the same debug interface as the RW tool. The trace tool may be used to support continuous trace functions, and differs from a conventional trace using the RW tool in the way that that the trace tool reads out a continuous stream of trace data.

The TAS server thus functions to enable a host device (e.g. a laptop, personal computer, etc.) to send and receive data to the devices A and B to perform debugging and/or tracing. The TAS server converts commands to interface protocols, and vice-versa, such that the host devices may receive the trace data from the devices A and B. Again, the trace data instances transferred to the host devices via the TAS server are conventionally unencrypted, and the embodiments as discussed in further detail herein facilitate the encryption and authentication of this data to ensure security of the trace data.

Thus, the trace modules are configured to provide data to the host controlled bus master in accordance with the parameters of operation as identified via the host device. The trace data is then transmitted to the host device via each devices respective host system interface, as discussed above. In this way, the trace modules translate trace signals into internal bus actions, which enable the trace data instances to be monitored via communications with a suitable host system.

Figure 1B:
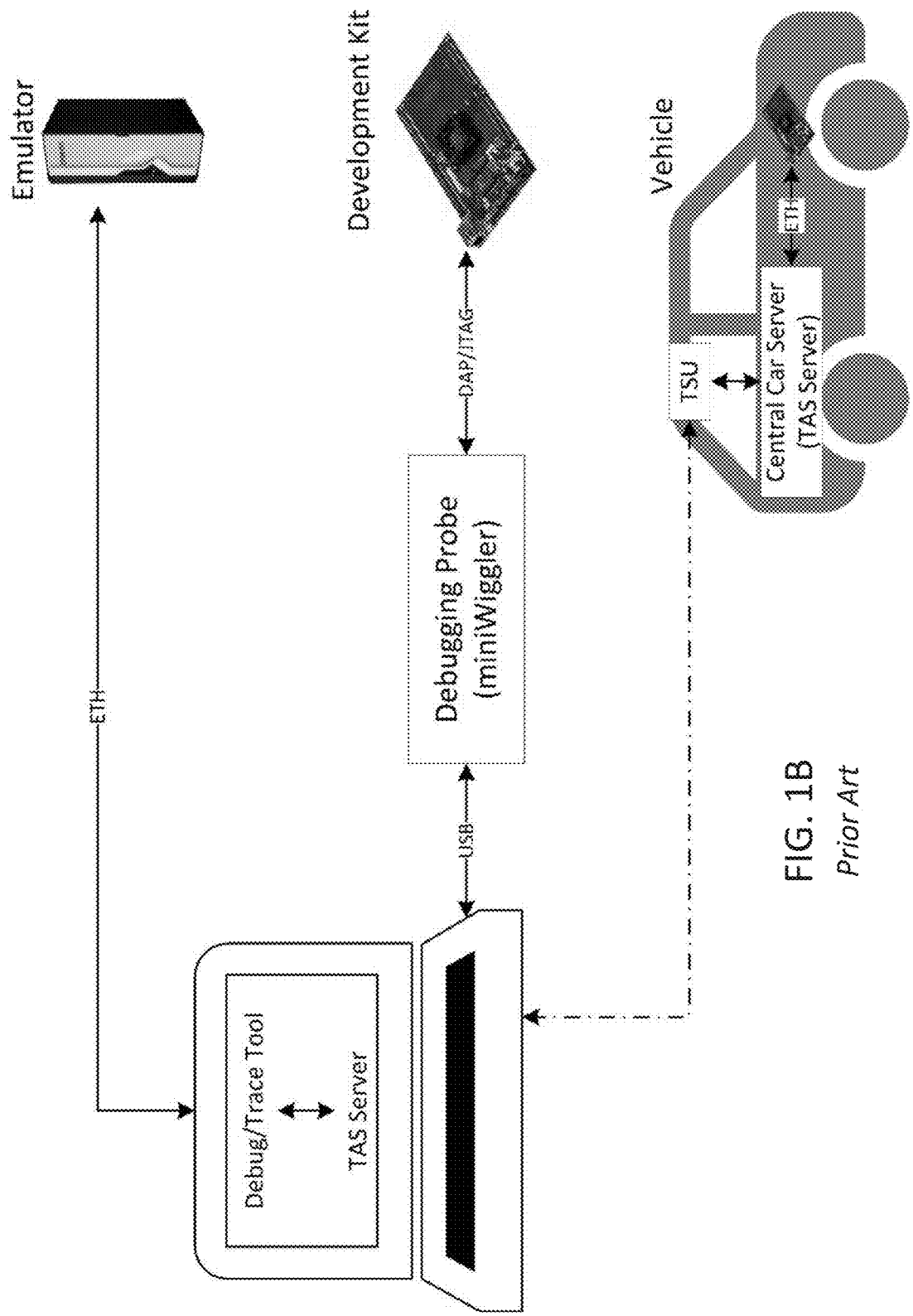
FIG. 1B illustrates a block diagram of a conventional debugging and tracing tool architecture for vehicle development.

FIG. 1B illustrates a block diagram of various implementations of a debugging and tracing system. Again, the embodiments as discussed herein may be implemented in accordance with any suitable type of debugging and/or tracing system in which data is transferred to an external device with respect to the system resources that are monitored. One such implementation that may be particularly useful for the application of the embodiments as discussed herein may comprise software development in the automotive industry. Thus, any of the architectures as discussed above with respect to FIG. 1A may likewise be implemented to perform debugging and/or tracing of system resources that may be identified with components of a vehicle. This may include, for example, receiving trace data instances from any suitable device that may be developed for use in a vehicle, such as via the development kit that may be debugged and/or traced as part of a development kit, and which may optionally be debugged and/or traced in situ, e.g. within the vehicle in which it is to be implemented.

Thus, the embodiments discussed herein may be implemented to receive trace data instances securely by way of encryption and authentication of the trace data instances. The encrypted trace data instances may be received by any suitable device, such as the host device (the debug/trace tool) as shown in FIG. 1B. In doing so, a remote vehicle diagnosis may be achieved, and the same software infrastructure may be maintained throughout all stages of development. This advantageously allows for software from different vendors to be run and debugged and/or traced while being executed on the same device.

Additionally or alternatively, the embodiments discussed herein may also be implemented using an emulator, as shown in FIG. 1B. An emulator may be implemented as any suitable combination of hardware and/or software, such as a server or other computing device, and which is configured to emulate the same functionality of a chip, processor, etc. Emulators may be particularly useful when the chip is at an early stage of development in which it has not yet been fabricated. Such an emulator may form part of a cloud computing infrastructure, and thus the communications with a host device may occur over the Internet, which may risk exposing the unencrypted trace data. Thus, when an emulator is implemented, the embodiments as further described herein may be utilized by the emulator such that the host device (e.g. the debug/trace tool as shown in FIG. 1B) may likewise receive encrypted trace data from the emulator in the same manner as the encrypted trace data would be provided by the physical device that is emulated. In this way, the trace data is secured regardless of the particular implementation or architecture used.

Figure 2A:
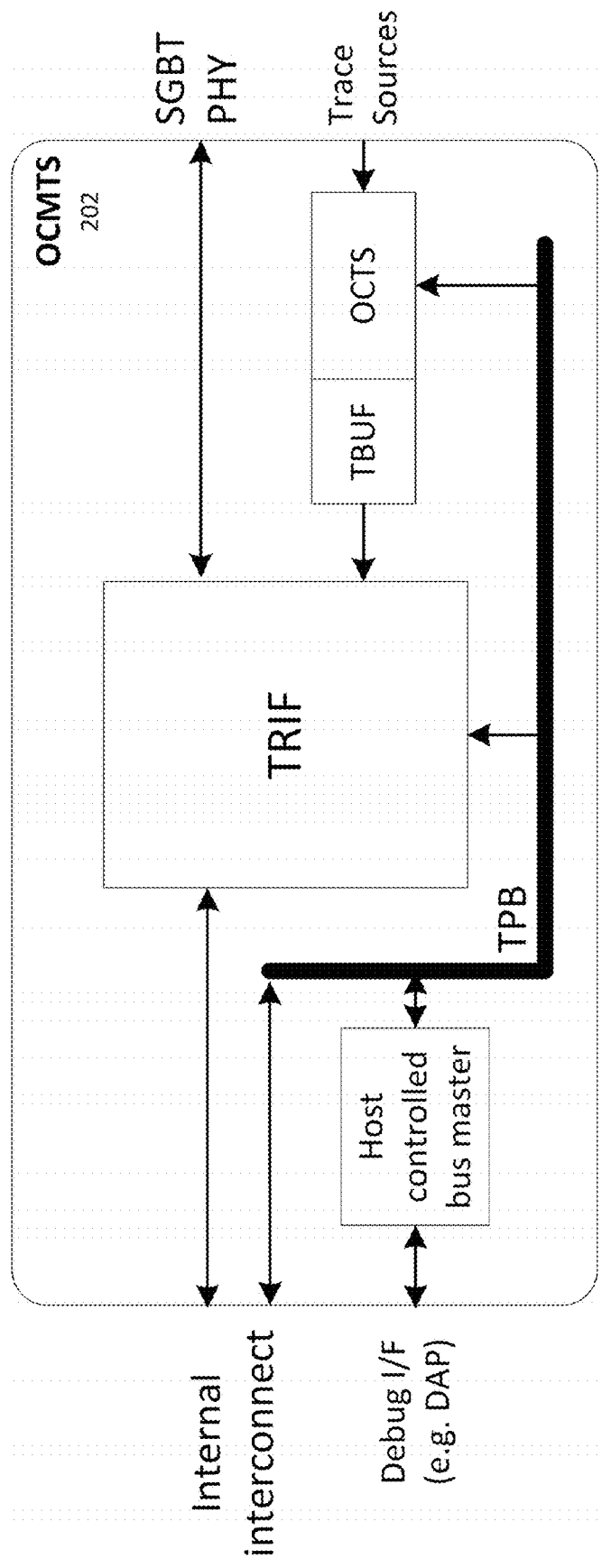
FIG. 2A illustrates a block diagram of a conventional on-chip solution for providing debugging and tracing.

FIG. 2A illustrates a block diagram of a conventional on-chip solution for providing debugging and tracing. As noted above, modern microcontrollers are typically implemented with various debug and trace interfaces, e.g., Joint Test Action Group (JTAG), device access port (DAP), Serial Wire debug (SWD), a Low Pin Debug (LPD) interface, etc. However, such interfaces are conventionally utilized in a controlled lab environment where the confidentiality and security of transmitted data is not a concern. Moreover, an open debug interface is considered a major security threat, and therefore the debug interface is usually locked when the target device (e.g. a microcontroller (MCU)) is deployed in the field.

However, with the increasing software content in applications using MCUs, there is an increasing need for better software observability, not only during the development phase but also once the product is deployed in the field. Thus, the on-chip multi tool support (OCMTS) 202 as shown in FIG. 2A may support a trace system that is configured to be operated independently from the debug functionality. Furthermore, the architecture of the OCMTS 202 as shown in FIG. 2A enables the trace data to be streamed through various trace interfaces as shown, which may include an Ethernet interface utilizing minimal or no software support. Thus, the OCMTS 202 may be identified with a microprocessor or other suitable components, and serves as a central location for functional modules to enable intrusive (i.e. debugging) and non-intrusive (i.e. tracing) observations of device functions. In this way, the OCMTS 202 functions to bridge the internal interconnect (e.g. a shared resource interconnect SRI) and the debug communication paths to support debug, trigger, and trace functionality.

An important building block in the trace data path is the Trace Buffer (TBUF), which may also be referred to herein as a trace data buffer. The TBUF stores trace messages acquired from an on-chip trace system (OCTS), which may represent one or more observational blocks as discussed above, and which may be referred to as trace observation blocks in the context of performing tracing functions. Thus, the OCTS may be identified with an observational block such as the OCDS described above, although as the focus of the embodiments herein is with respect to tracing versus debugging, the OCTS is shown in FIG. 2A. The trace messages are output by the OCTS as a result of the trace observational blocks tapping (i.e. tracing) the various trace sources. Thus, the TBUF stores outputs from the trace observation blocks via the receipt of the trace messages from the OCTS. Several trace messages can span across one buffer entry, i.e. the so called trace lines.

That is, and as further discussed herein, the data output by the OCTS may comprise trace data that is organized into so called paragraphs, with each paragraph containing multiple trace messages including the end of trace message. The tlines as discussed herein may represent any number of trace messages and their corresponding data that constitute these paragraphs. In the example shown in FIG. 2A, the TBUF is accessible through the same 32-bit wide trace peripheral bus (TPB) secondary interface as the OCTS registers. Therefore, the TBUF is within the OCTS address range, and the size of the TBUF may be an architectural decision that depends upon the available chip area and cost. Thus, and as shown in FIG. 2A, the OCTS is configured to receive trace data from one or more respectively-coupled trace sources as shown in FIG. 2A, and to store the trace data in the trace buffer TBUF as part of the trace messages. Again, the trace sources may comprise, for instance, a CPU, a processor core, etc. It is noted that although an OCTS is shown in FIG. 2A, this is by way of example and not limitation, and the OCTS may alternatively be implemented in various ways.

Figure 2B:
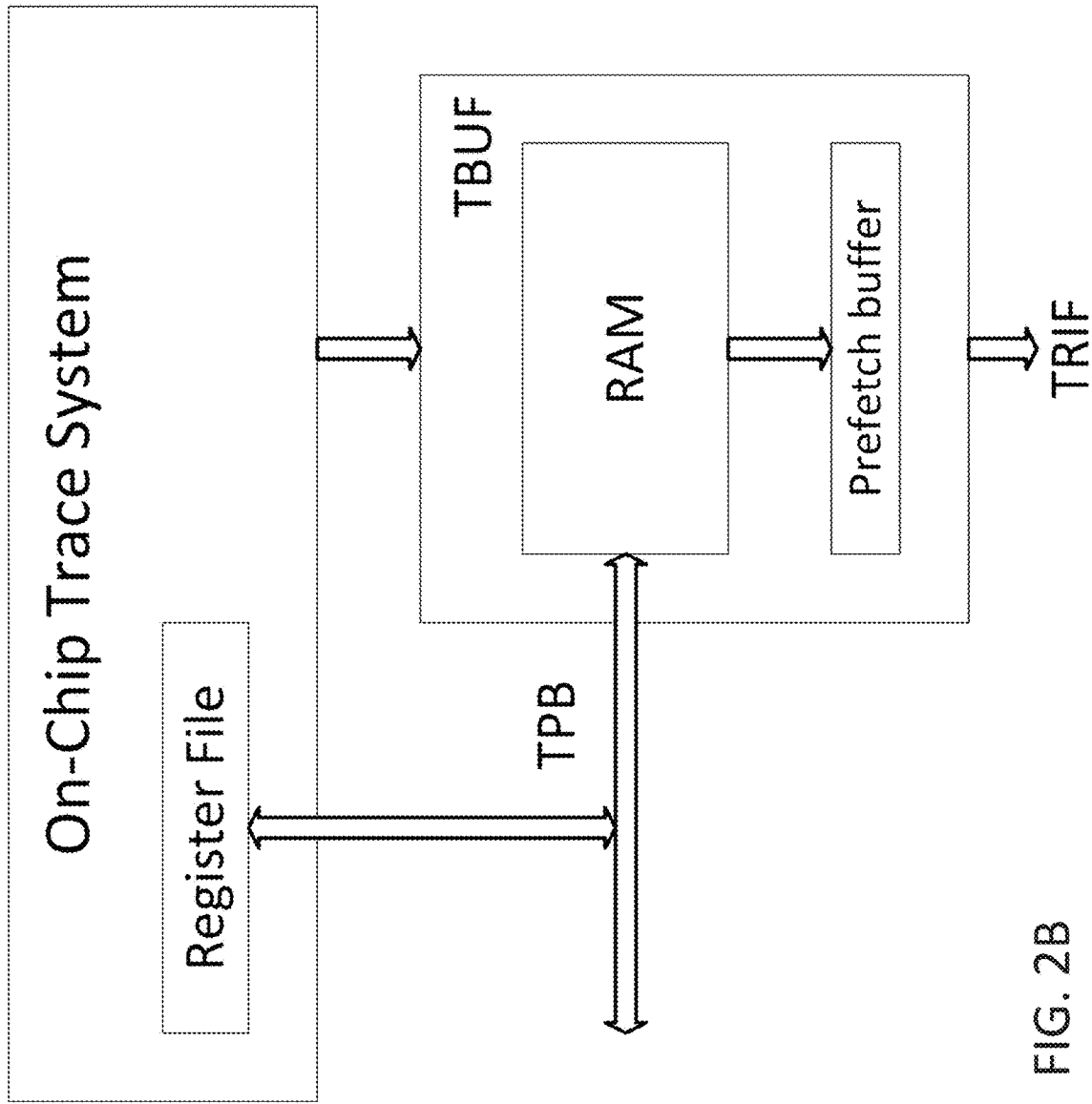
FIG. 2B illustrates a block diagram of conventional trace buffer (TBUF) access paths.

Furthermore, the architectures as shown in FIGS. 2A and 2B are also provided by way of example and not limitation, and may implement additional, fewer, or alternative components as those shown in FIGS. 2A and 2B. The OCTS may comprise observational blocks, which may compose processor observation blocks and bus observation blocks, which each contain respective trace units. For example, a Program Trace Unit (PTU) may be implemented as part of the OCTS, as a PTU is configured to trace the program execution of a processor core. As another example, a Data Trace Unit (DTU) may be additionally be implemented as part of the OCTS, which is able to process read or write transactions for example on a CPU trace interface or a bus system, consisting of address, data, and auxiliary information. The architecture as shown in FIG. 2A may also implement a Time Stamp Unit (TSU) (not shown), which is configured to deliver all time information, both for internal use (time tags) and messages (time stamps), to all the other parts of the OCTS.

Thus, to summarize the operation of the OCMTS 202, each trace unit identified with the OCTS receives trace data from a respectively coupled trace source in the form of trace messages, the details of which being further discussed below. The trace data from these trace messages is then stored temporarily in the respective trace buffer and made available through various output interfaces through the trace interface (TRIF). The TRIF is configured to route the trace data through the selected interface (e.g. the debug interface, the serial gigabit trace interface (SGBT), or the internal interconnect). In this way, the trace data can be read out through a debug interface, a SGBT, or stored in on-chip RAM (not shown).

Additional details regarding the interface between the TBUF and the OCTS are also shown in FIG. 2B, which illustrate the TBUF access paths as shown in FIG. 2A. The other remaining functions of the OCMTS 202 as shown in FIG. 2A and the TBUF access paths as shown in FIG. 2B are generally known, and thus a further explanation is not provided herein for purposes of brevity. Again, the trace data that is communicated to the host devices (as discussed above) is generally not encrypted or otherwise secured, and the embodiments as described in further detail herein address this issue by leveraging data that is typically received as part of the tracing process to authenticate and encrypt the trace data. Although the use of debugging and tracing has been described above with respect to specific interfaces and/or components, this is provided by way of example and not limitation. The embodiments as discussed herein may provide secure trace data in accordance with any suitable system and/or architecture, which may leverage any suitable components such as a host system interface, debug interface, and observation block as discussed herein, or alternate components. Moreover, the embodiments as discussed herein may be realized by modifying one or more components of the OCMTS 202 as shown in FIG. 2A such that the trace data provided to the TRIF is encrypted and subsequently authenticated by the receiving device. In any event, the techniques as described herein with respect to the generation and transmission of secure trace data are not limited to specific architectures, devices, interfaces, components, protocols, etc.

II. Secure Trace Data Architectures

FIG. 3A illustrates a first example of a secure trace data architecture, in accordance with one or more embodiments of the present disclosure. The architecture as shown in FIG. 3A is shown with respect to a microcontroller (MCU) 300, although this is by way of example and not limitation. Moreover, the secure trace data architecture as shown in FIG. 3A may comprise additional, fewer, or alternative components depending upon its implementation. The various arrows as shown in FIG. 3A may represent any suitable number of connections between respective components, such as for instance buses, wires, ports, interfaces, etc., which may enable the respective components to transmit, receive, or otherwise transfer the various types of data between one another as further discussed herein. Furthermore, although the embodiments are described herein with respect to an MCU, the MCU 300 may alternatively comprise any suitable type of device for which secure trace data is to be generated.

The MCU 300 may comprise any suitable number and/or type of trace sources 302, such as for example a CPU or other suitable processor circuitry that may be running any suitable number of virtual machines (VMs). Although multiple VMs are shown in FIG. 3A, this is by way of example and not limitation, and the use of these different VMs may not be needed when a single software vendor is present. However, in other instances, the different VMs may function to isolate their respective software components from other vendors. For example, and as further discussed below, the different VMs may use different secret keys to secure their respective traces and to separate the trace sources from one another, thereby maintaining security over the trace data that is subsequently encrypted and transmitted as the secure data.

The trace sources 302 may alternatively comprise one or more processor cores or any suitable component configured to execute machine-readable instructions that are subjected to tracing operations as further discussed herein. The trace sources 302 may be identified, for example, with the trace sources as shown and discussed above with respect to FIG. 2A. Moreover, the architecture as shown in FIG. 3A may utilize any of the components of the OCMTS 202 as discussed above with respect to FIG. 2A to facilitate the flow and transfer of trace data and/or trace messages in addition to the techniques as discussed with respect to the MCU 300. For example, the trace data buffer 304.3 may be identified with and/or function in the same manner as the TBUFs as shown in FIG. 2A, and the flow of the data stored in the trace data buffer may be implemented via a TRIF such as that shown and described above with respect to FIG. 2A, although these components are not shown in FIG. 3A for purposes of brevity.

The MCU 300 further comprises an accelerator 304, which is coupled to the trace sources 302 and to a data interface 306. The accelerator 304 may be implemented with hardware, software, or combinations of these. For example, to facilitate a software implementation, the MCU 300 may comprise processing circuitry 320, which may be implemented as any suitable number and/or type of dedicated hardware components such as one or more processors, cores, dedicated logic and/or other circuitry, etc. The processing circuitry 320 may be implemented as part of the debug circuitry 304.1 or as separate processors of the MCU 300.

The processing circuitry 320 may execute computer-readable instructions stored in the program memory 321 to perform the various functions of the accelerator 304 as discussed in further detail herein. The program memory 321 may comprise any suitable type of non-transitory computer readable medium such as volatile memory, non-volatile memory, or combinations of these. The program memory 321 may store executable instructions represented as the accelerator control module 322. Thus, when the instructions stored in the accelerator control module 322 are executed by the processing circuitry 320, any of the functionality described herein with respect to the accelerator 304 may be realized via software. However, given the amount of trace data that needs to be encrypted, it is noted that the use of a hardware accelerator instead of a pure software accelerator may be particularly advantageous. For example, for a processor running at 100 MHz (i.e. one of the trace sources 302), trace data may be generated at the rate of about 10 Gb/s, and this may be scaled per source that is monitored.

With continued reference to FIG. 3A, the accelerator 304 comprises debug circuitry 304.1, cryptographic circuitry 304.2, and a trace data buffer (TBUF) 304.3. The debug circuitry 304.1 may be implemented as hardware, software, or combinations of these. In various embodiments, the debug circuitry may be implemented as any suitable type of observation block, as discussed above, and thus may be identified for example with the trace modules as shown in FIG. 1A or the OCTS block as shown in FIG. 2A. The debug circuitry 304.1 is not limited to such implementations, however, and may be configured as any suitable number and/or type of components that receive trace data instances from the coupled trace sources 302 and generate corresponding trace messages.

Thus, the debug circuitry 304.1 is configured to receive trace data instances associated with respective functions executed by the MCU 300, and to generate trace messages that contain these trace data instances. The trace data instances may be collectively referred to herein simply as trace data. In other words, the various trace sources 302 generate a number of trace data instances over time, e.g. per executed instruction, which are then received by the debug circuitry 304.1 and used to generate the trace messages that contain these trace data instances, along with additional data fields, as further discussed herein. The debug circuitry 304.1 may be connected to and/or receive data from any other suitable components that may form a part of the MCU 300 or other suitable device, with such data being used in addition to or instead of the trace data instances to generate the trace messages as discussed in further detail below.

Figure 4:
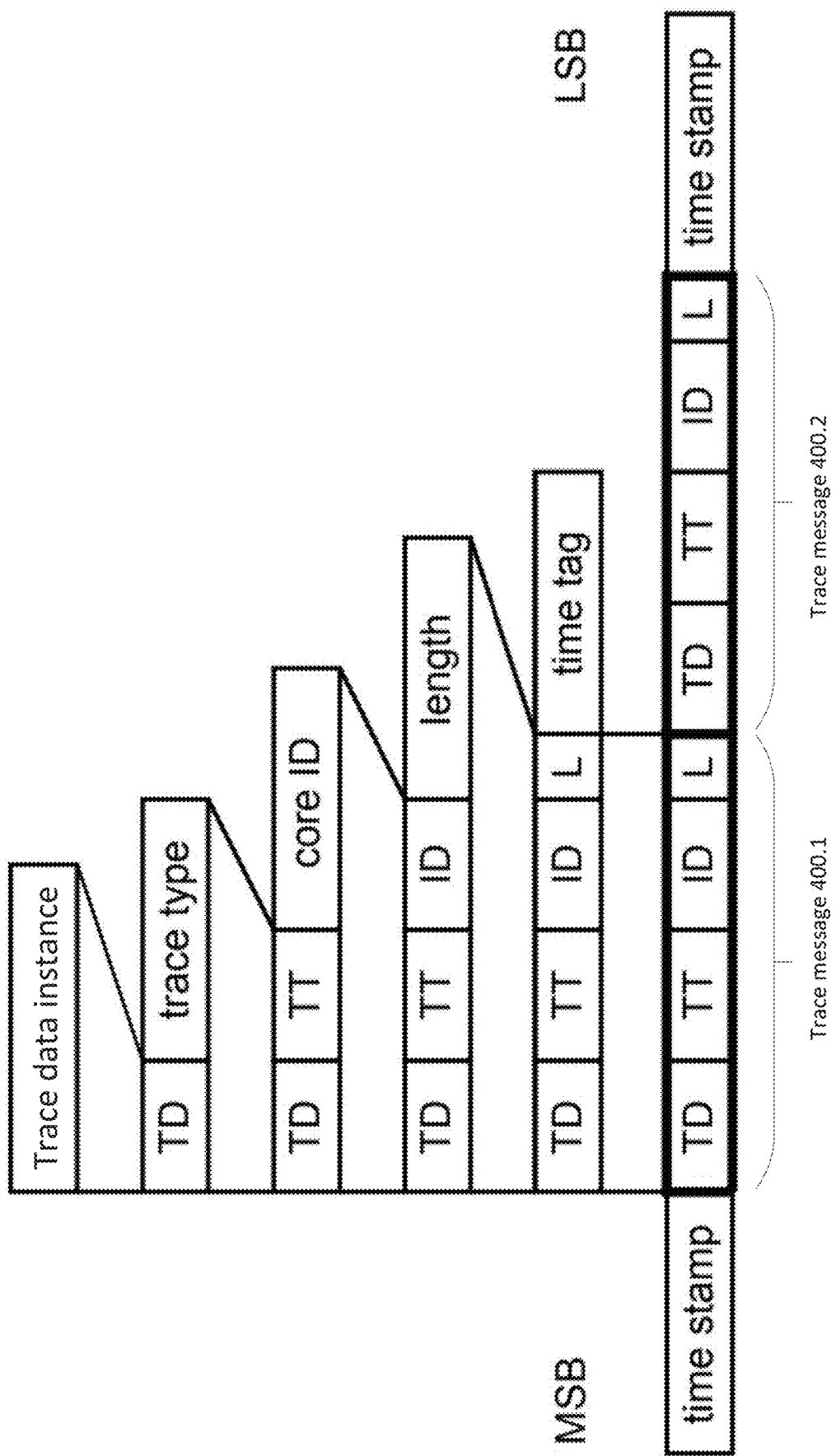
FIG. 4 illustrates an example format of a trace message, in accordance with one or more embodiments of the present disclosure.

The debug circuitry 304.1 is configured to generate the trace messages in accordance with a predetermined format and structure, an example of which is shown in further detail in FIG. 4. For example, the trace messages 400.1, 400.2 as shown in FIG. 4 comprise a trace data (TD) field, a trace type (TT) field, a core ID (ID) field, a length (L) field, and a time tag field. Each of these fields may have a value that is represented as with a predetermined number of bits, such that the respective values may be represented digitally based upon the values of the bits included in each field. Thus, FIG. 4 illustrates two different trace messages 400.1, 400.2, each comprising the same fields and having the same format.

The trace data (TD) field comprises the trace data information itself. Thus, each TD field may correspond to a single trace data instance, with each trace message 400.1, 400.2 comprising a respective trace data instance. For example, each trace data instance may comprise the current value of the instruction pointer, data values written to or read from a memory location, etc.

The trace type (TT) field may correspond to a value that indicates a message type so it can be recognized and decoded by a device that receives the encrypted trace data, as further discussed herein. Thus, the TT field may represent any suitable value based upon the particular encryption and message format that is used. For example, the TT field may be defined in accordance with a catalog based on Nexus message types, an example of which is shown in Table 1 below. It is noted that the Trace Type (TT) code may be reused for different variants of a message format, and message subtypes may be uniquely identified by a pair of core ID and TT values.

TABLE 1

| TT0 | <uncompressed data> | 000 |
| TT1 | <compressed data> | 001 |
| TT2 | <uncompressed data><subtype> 010 | 010 |
| TT3 | <compressed data><subtype> | 011 |
| TT4 | <uncompressed data 2><uncompressed data 1><length 1> | 100 |
| TT5 | <compressed data 2><compressed data 1><length 1> | 101 |
| TT6 | <uncompressed data 2><uncompressed data 1><length 1><subtype> | 110 |
| TT7 | <compressed data 2><uncompressed data 1><length 1><subtype> | 111 |

The core ID field is identified with the source of the trace. For example, if multiple processor cores are monitored by the debug circuitry 304.1, then the core ID field may be used to identify each respective core with its trace data instances.

The length (L) field closely correlates with the message type, although it may be prefixed to maintain the decoder logic for a message sequencer and memory packer simple and reusable. Thus, the length field depends on the trace type, and indicates all bits of a trace message, excluding the bits representing the length field itself.

The time tag field is used to maintain a chronological order of information in the trace messages, which may be used by the accelerator 304 to store the trace messages in chronological order in the trace data buffer 304.3, as further discussed herein. The same tag value thus means that the data identified with different trace messages was generated at the same time. The tags themselves are not stored in the trace data buffer 304.3 and are not visible externally to the MCU 300. Instead, the time tag is generated by a time stamp unit of the MCU 300 (not shown), which may form part of the debug circuitry 304.1 or other suitable components of the MCU 300, and is implemented for internal use by the MCU 300.

The time stamp field (TS) may represent a value that is scaled in accordance with any suitable time value, which may be derived from the system clock used for the execution of the monitored trace sources 302. For example, if a system clock of 100-300 MHz is implemented, then the time stamp field value may represent a scaled time value represented in microseconds. The time stamp messages may be generated in any suitable manner and/or via any suitable component that is identified with and/or accessed by the MCU 300. For example, the time stamp messages may be generated by a TSU implemented via the debug circuitry 304.1. As used herein, the time stamps identified with one or more of the trace messages, which are used to encrypt the trace data instances as further discussed herein, may be identified with those generated, for example, via such a TSU, which again may be implemented as part of the debug circuitry 304.1, for example. Thus, the time stamp value may represent any suitable number of bits that enable a unique time value to be provided for one or more trace messages, such as a counter value, a timer value, etc.

Therefore, each of the trace messages comprises a single trace data instance, and one or more trace messages may be identified with a single time stamp value. For instance, the two trace messages 400.1, 400.2 as shown in FIG. 4 may be identified with the same time stamp value, which may comprise the time stamp on the LSB side of the two trace messages, with the time stamp on the MSB side being identified with one or more subsequent trace messages (not shown). In other words, both trace messages 400.1, 400.2 may share a common time stamp. In other embodiments, each trace message may be identified with a single, unique time stamp (not shown). Thus, in such a scenario, the trace message 400.1 may be identified with a first time stamp, whereas the trace message 400.2 may be identified with a second, different time stamp. The placement of the time stamps before or after the trace messages, as well as the number of trace messages per time stamp, may all be varied in accordance with the configuration settings of the accelerator 304, in various embodiments.

III. Cryptographic Functionality

Again, a flaw of current trace interfaces is that the trace data is transmitted unencrypted and therefore susceptible to interception and snooping. To address this issue, the accelerator 304 also comprises cryptographic circuitry 304.2, which may be implemented as any suitable combination of hardware, software, or combinations of these to perform any suitable type of cryptographic operation on any portion of the data contained in the trace messages. For instance, the cryptographic circuitry 304.2 is configured to perform authenticated encryption of any of the data contained in the fields of the trace messages. For example, the cryptographic circuitry 304.2 may perform authenticated encryption of the trace data instances, and may additionally perform authenticated encryption of the data in any of the other fields of the trace messages as discussed herein.

The cryptographic circuitry 304.2 may be configured to perform authenticated encryption in accordance with any suitable type of symmetric encryption and authentication function. This may comprise any suitable type of algorithms and/or the use of hardware to perform authenticated symmetric encryption of any data that is provided as an input, which may be referred to herein as plaintext. For example, the symmetric encryption and authentication function performed by the cryptographic circuitry 304.2 as further discussed herein may correspond to those used as part of an authenticated-encryption process that is implemented in accordance with a Galois/Counter Mode (AES-GCM) mode of operation, or an extension thereof, e.g. AES-GCM-SIV. However, it is noted that the AES-GCM and AES-GCM-SIV modes of operation are provided by way of example and not limitation, and the cryptographic circuitry 304.2 may perform authenticated encryption in any suitable manner, which may be identified with standards or modes of operation that may differ from the AES-GSM or AES-GSM-SIV modes of operation. For example, other symmetric cryptographic algorithms that may be implemented comprise ChaCha-Poly, ASCON, etc.

Figure 3B:
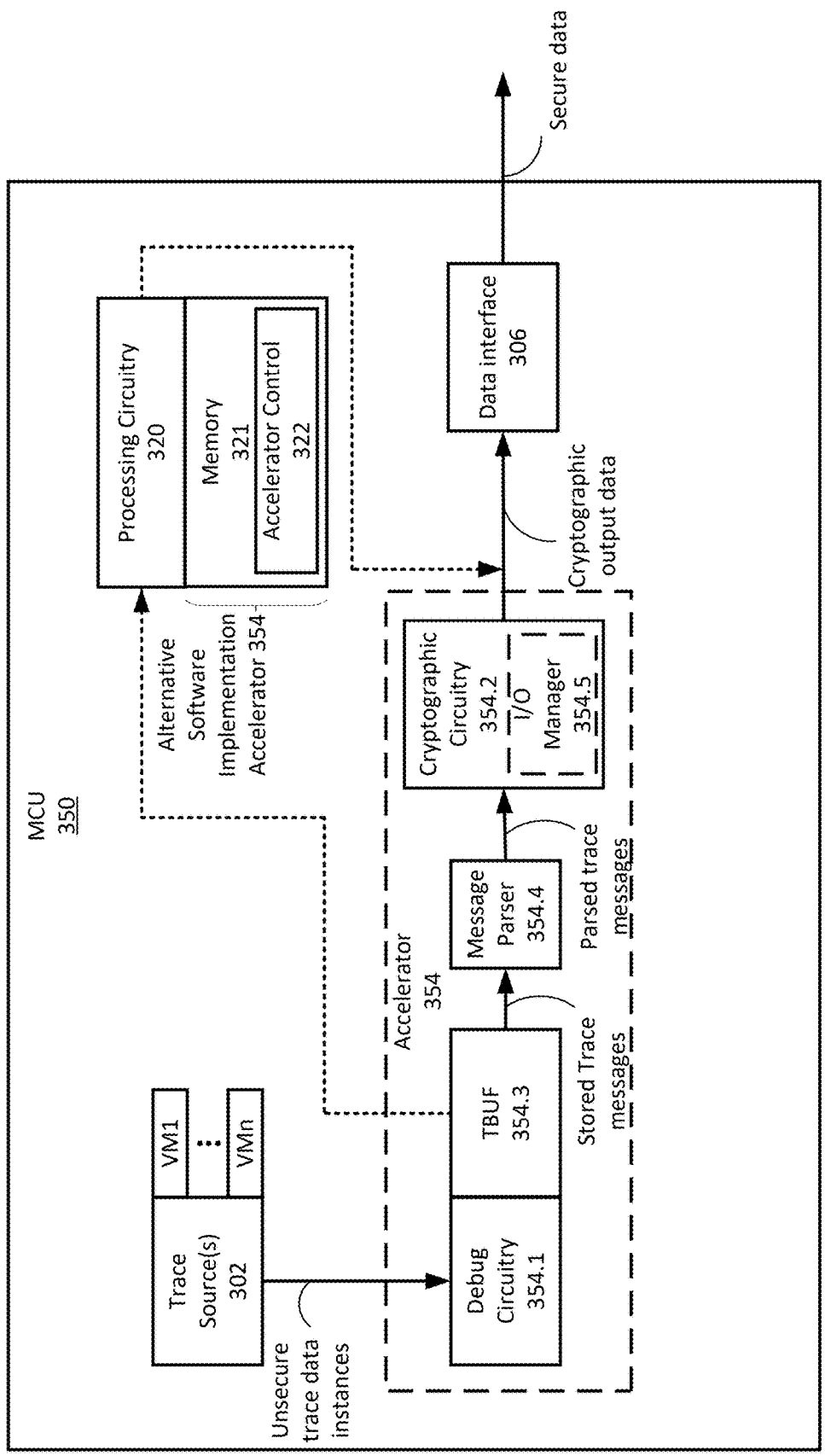
FIG. 3B illustrates a second example of a second secure trace data architecture, in accordance with one or more embodiments of the present disclosure.
Figure 5A:
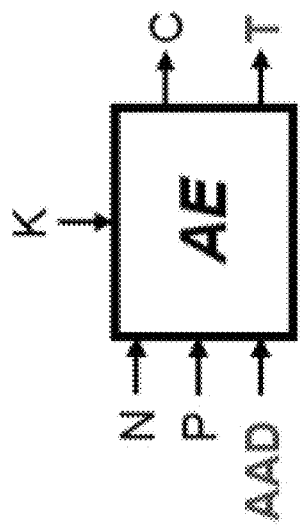
FIG. 5A illustrates an example authenticated encryption block, in accordance with one or more embodiments of the present disclosure.

To better explain the operations performed by the cryptographic circuitry 304.2, FIG. 5A illustrates an example authenticated encryption block, in accordance with one or more embodiments of the present disclosure. The authenticated encryption block 502 as shown in FIG. 5A may be identified with the cryptographic circuitry 304.2, 354.2 as shown in FIGS. 3A and 3B, respectively. The authenticated encryption block 502 receives four inputs and provides two outputs. The four inputs include the secret key (K), a number used only once ("nonce," N), additional authentication data (AAD), and plaintext (P). The two outputs comprise an authentication tag (T) and ciphertext (C).

The cryptographic circuitry 304.2 may use data contained in one or more of the data fields of the trace messages, as well as the time stamp identified with one or more of the trace messages (which also may comprise part of the trace messages) to generate the inputs and outputs of the authenticated encryption block 502. To do so, the cryptographic circuitry 304.2 may comprise an I/O manager block 304.4, which may be implemented as hardware, software, or combinations of these. The I/O manager block 304.4 may form part of the cryptographic circuitry 304.2 as shown in FIG. 3A or be implemented as a separate component, in various embodiments.

The I/O manager block 304.4 is configured to map the data contained in the various fields in the trace messages (or stored in other suitable locations, which is the case for the secret key as discussed below) to the appropriate inputs of the authenticated encryption block 502 as discussed herein. The I/O manager block 304.4 is also configured to generate the appropriate input values of the authenticated encryption block 502 based upon the data contained in one or more of the data fields of the trace messages and/or the time stamp value, as discussed in further detail below. Additionally, the I/O manager block 304.4 is configured to map the outputs of the authenticated encryption block 502 to a suitable interface, e.g. one that is coupled to and used to store the outputs in the trace data buffer 304.3 (for the example embodiment as shown in FIG. 3A) or the data interface 306 that is used to provide the secure trace data to an external device (for the example embodiment as shown in FIG. 3B).

Referring now back to the inputs of the authenticated encryption block 502, the secret key (K) is generally static and does not change over the operational life of the cryptographic circuitry 304.2. The secret key may comprise any suitable value having any suitable bit length, which may be used in accordance with the symmetric encryption type that is implemented via the authenticated encryption block 502. Thus, the secret K may be flashed, written to, stored, etc., as part of an initial manufacturing process of the MCU 300. With the use of symmetric encryption, a receiving device, such as a host device as discussed herein, may likewise store and/or have access to the same secret key K, which is then used by the receiving device to decrypt the plaintext that is encrypted via the cryptographic circuitry 304.2. Additional details of the decryption and authentication process are discussed further below.

In some embodiments, the secret K used by the cryptographic circuitry 304.2 to perform the symmetric encryption of the plaintext data may be selected and/or mapped from one of several different secret keys. This may be particularly useful, for example, when there are multiple trace sources 302, with some of the multiple trace sources being identified with different manufacturers (i.e. vendors), for example. The set of secret keys K1, K2, K3, etc., may thus be stored in any suitable memory location and/or otherwise accessible to the cryptographic circuitry 304.2. The set of secret keys may also be stored in a manner that enables the cryptographic circuitry 304.2 to correlate each secret key with a respective trace source 302. For example, each of the virtual machines as shown in FIGS. 3A-3B may be identified with a respective secret key, such that VM1 is associated with a key K1, VM2 is associated with a key K2, and so on. To ensure security between the trace data generated from each of the trace sources, the set of secret keys may be stored in a protected manner such that each virtual machine may only access the memory location of its own key and may not have access to other secret keys and/or their respective locations in memory.

Figure 5B:
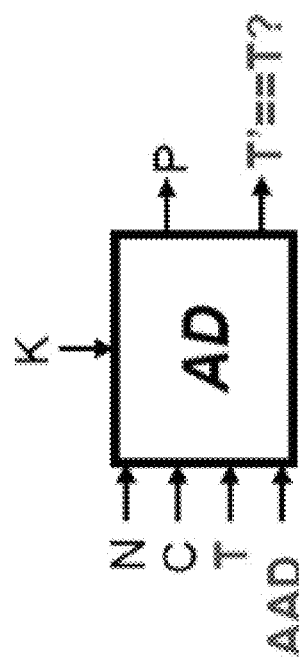
FIG. 5B illustrates an example authenticated decryption block, in accordance with one or more embodiments of the present disclosure.

For example, the cryptographic circuitry 304.2 may use one or more fields contained in the trace messages (e.g. the core ID) to retrieve a secret key that correlates with that particular trace source. The receiving device may likewise be configured to identify a secret key based upon data that may be separately transmitted unencrypted, such as the core ID or other suitable identifier of the trace source that is associated with the encrypted, secure data that is received. Thus, the secret key as shown in FIGS. 5A and 5B may be one of several secret keys, with each one of the secret keys corresponding to a respective one of the plurality of trace sources 302. In accordance with such embodiments, the cryptographic circuitry 304.2 is configured to perform the symmetric encryption and authentication function in accordance with one of the plurality of keys that corresponds to (i.e. selected and/or mapped to) a respective one of the plurality of trace sources. In this way, the secure data provided by the data interface 306 may be accessed by multiple parties, each having their own designated secret keys, which prevents access to the trace data by other manufacturers.

The plaintext (P) may correspond to data contained in any of the respective fields present in the trace messages, with the data being symmetrically encrypted via the cryptographic circuitry 304.2, as further discussed herein. As will be further discussed below, the time stamp value may be used to derive the nonce value, and thus the number of data fields that are encrypted (i.e. that form the plaintext (P)) may be a function of the number of trace messages that are identified with a single time stamp value.

For example, when multiple trace messages are identified with a single time stamp value, then the plaintext may comprise data contained in any of the respective fields of the multiple trace messages as shown in FIG. 4 (e.g. the trace data instance, the trace type, the core ID, the length, etc.). Thus, in some embodiments when multiple trace messages share a common time stamp value, only the trace data instance from the multiple trace messages identified with a common time stamp is provided as the plaintext. However, in other embodiments, data contained in alternate or additional fields from the multiple trace messages identified with the common time stamp is provided as plaintext for symmetrical authenticated encryption.

To provide another example, when a single trace message is identified with a single time stamp value, then the plaintext may comprise data contained in any of the respective fields in a single trace message (e.g. the trace data instance, the trace type, the core ID, the length, etc.). Thus, in embodiments in which a trace message is identified with a single time stamp value, only the trace data instance from a single trace message is provided as the plaintext. However, in other embodiments, data contained in alternate or additional fields in the single trace message may be provided as plaintext for symmetrical authenticated encryption.

In any event, in embodiments in which the plaintext may represent data contained in more than one of the fields of a single trace message or, alternatively, data contained in the fields of multiple trace messages identified with a common time stamp, the plaintext may represent a concatenation of data contained in the respective fields.

To provide an illustrative example, when a single trace message is identified with a single time stamp and the plaintext comprises data in addition to the trace data instance, the data contained in the respective fields of the single trace message may be concatenated together in a predetermined manner that represents the plaintext P.

To provide another illustrative example, when multiple trace messages are identified with a common time stamp, the plaintext may comprise a concatenation of trace data instances (and optionally data from additional fields) from each of the multiple trace messages that share the common time stamp value, with the concatenation also being performed in a predetermined manner. Thus, in some embodiments the cryptographic circuitry 304.2 is configured to perform authenticated encryption of the trace data instances included in two or more trace messages by concatenating trace data instances included in the two or more trace messages. In such a case, the cryptographic circuitry 304.2 is configured to perform the symmetric encryption and authentication function on the plaintext by generating a nonce value that is based upon the common time stamp value. Otherwise, the cryptographic circuitry 304.2 is configured to generate the nonce value using the time stamp value on a per trace message basis. Additional details regarding the nonce value and how it is generated are provided directly below.

The number used only once (nonce) value may be alternatively referred to as an initialization vector, and may be of any suitable length (such as a bit string) and represent any suitable value. The length of the nonce value is based upon the type of symmetric encryption and authentication function that is performed on the plaintext. Using the AES-GCM encryption as an illustrative example, AES-GCM defines a nonce length of 96 bits. The nonce value N should be unique for each plaintext P and AAD that are used to provide the resulting ciphertext C and authentication tag T, which are received at the receiver side, with the ciphertext being unencrypted and the authentication tag T being used for authentication of the received ciphertext data, as further discussed herein.

In an embodiment, the cryptographic circuitry 304.2 may generate the nonce value based upon a time stamp value that is identified with the contents included in one or more of the trace messages that is to be encrypted. Once the nonce value is generated, the cryptographic circuitry 304.2 then utilizes the secret key and the nonce value to perform the symmetric encryption and authentication function on the plaintext to thereby generate the ciphertext as discussed in further detail herein. In other words, the cryptographic circuitry 304.2 is configured to generate the nonce value for one or more of the trace messages containing data that is to be encrypted, with the nonce value being based upon the time stamp value that corresponds to the trace data instance or other data contained in other data fields that is to be encrypted.

Thus, when multiple trace messages share the same time stamp value, the same nonce value may be used to encrypt the concatenated contents of the data fields from the multiple trace messages having the common time stamp, as noted herein. However, when single trace messages are identified with a single time stamp, then different nonce values may be used to encrypt the contents of the data fields from the each of the trace messages based upon each trace message's respective time stamp, as noted herein. Thus, the embodiments described herein advantageously leverage the time stamp value, which is unique per instance of plaintext to be encrypted and is derived from data contained in one or more of the trace messages, to generate a unique nonce value for this encryption process.

Again, the nonce value may have a predetermined length (i.e. a predetermined number of bits) that may be the same as, less than, or greater than that of the time stamp value identified with one or more of the trace messages. For example, the time stamp value may be 32 bits and the nonce value bit length may need to be 96 bits in length, which is the case when the cryptographic circuitry 304.2 operates in accordance with the AES-GCM mode of operation (or the extended AES-GCM-SIV mode) to perform the symmetric encryption operations on the plaintext. In such a scenario, the cryptographic circuitry 304.2 may generate, for one or more of the trace messages containing data fields representing the plaintext that is to be symmetrically encrypted, a respective nonce value by concatenating a predetermined number of bits representative of the time stamp value with another predetermined number of bits (e.g. 64 bits in the present example) representative of a predefined value. This predefined value may be a static (i.e. constant) value, which may be known by the MCU 300 and the receiving device such that the encrypted data that is received may be decrypted, as further discussed herein.

In the event that the nonce value is less than the time stamp value, the time stamp value may be truncated, for instance, by removing a predetermined number of MSB bits, LSB bits, or a combination of the MSB and LSB bits such that the time stamp value is reduced to a bit length required for the nonce value. It is noted that in such a scenario, consideration should be given to the bits that are truncated in this manner to ensure that the time stamp value remains unique per plaintext encryption instance.

The AAD functions to add a secondary level of security, as the AAD is used for authentication by the receiving device, and therefore if an attacker modifies the bits of the AAD the verification process at the receiver side will detect the modification. Like the nonce value, the AAD may also be of any suitable length (i.e. bit length) and represent any suitable value. In various embodiments, for each plaintext encryption instance, the AAD may also comprise any combination of the data fields that are derived from the trace messages identified with the time stamp used to generate the nonce value, as discussed above.

For example, the AAD may comprise the time stamp value, which again is unique for each plaintext P encryption instance and AAD that are used to provide the resulting ciphertext C that is received at the receiver side. Additionally or alternatively, the other data fields of the one or more trace messages that are identified with the time stamp used to generate the nonce value may be used to provide the AAD. For example, any combination of the time stamp value, the core ID, the trace type, the length, etc., which may be concatenated from any suitable number of trace messages having a common time stamp value, may be used as the AAD.

Thus, the cryptographic circuitry 304.2 may utilize each of the four inputs as discussed herein to perform a symmetric encryption and authentication function on the plaintext to generate the ciphertext and authentication tag T. The resulting ciphertext C thus represents encrypted data from the plaintext comprising one or more of the fields of the trace messages as noted above. For example, the ciphertext may comprise encrypted trace data that is stored in the trace data buffer 304.3. The encrypted trace data may comprise, for example, a set of encrypted trace data instances that are stored in the trace data buffer 304.3 over time, which correspond to the trace data instances that have been encrypted from any suitable number of the trace messages. The authentication tag T may be generated using the nonce value and the secret key in any suitable manner, which may be a function of the symmetric authentication encryption scheme that is implemented, and may include known types. The authentication tag T may thus represent any suitable type of encoded data that is used by the receiving device to authenticate the received ciphertext, as further discussed herein.

For each set of plaintext data that is encrypted in this manner, the cryptographic circuitry 304.2 may store the outputted ciphertext C and authentication tag T, as well as the AAD and nonce values, to the trace data buffer 304.3 as cryptographic output data as shown in FIG. 3A. It is noted that the nonce value and the AAD are not encrypted, i.e. these are used for decryption and authentication at the receiver side, and may be persisted in clear text, i.e. stored and/or communicated unencrypted. However, although the ciphertext C and authentication tag T should be stored in the trace data buffer 304.3, the nonce values and the AAD values may optionally be stored. That is, the nonce values and the AAD values need not be stored "explicitly," as these values may be derived from the timestamp as needed (either by the MCU 300 or a receiving device). Thus, as long as the time stamp value is stored (which may form part of the trace messages stored in the trace data buffer as noted herein) or are otherwise accessible, the nonce values and AAD values may be derived therefrom.

Thus, the nonce value and AAD may be transmitted to the external (i.e. receiving or host) device together with the encrypted ciphertext data or as a separate data transmission. The receiving device also has knowledge of the symmetric encryption algorithm and the technique used to generate the nonce value from the time stamp value. And because the AAD contains the time stamp value used to generate the nonce value for each ciphertext, the external device may receive the AAD, extract the time stamp value, and reconstruct the nonce value from the time stamp value to decrypt the encrypted trace data using the receiver's secret key.

The accelerator 304 further comprises a trace data buffer (TBUF) 304.3. The trace data buffer 304.3 may be implemented as any suitable type of memory, such as volatile or non-volatile memory, and may be of any suitable memory size. The trace data buffer 304.3 may have any suitable format or structure, and thus be configured to store any of the cryptographic output data generated by the cryptographic circuitry 304.2 as discussed above. For example, the trace data buffer 304.3 is configured to store the encrypted trace data or any other data contained in the fields of the trace messages that has been encrypted by the cryptographic circuitry 304.2 as discussed above. The trace data buffer 304.3 may store the any of the cryptographic output data in accordance with any suitable format, which may be a result of the manner in which the cryptographic circuitry 304.2 writes data to the trace data buffer 304.3. The trace data buffer 304.3 may thus store the trace data in an encrypted form that corresponds to the chronological order in which the trace messages were generated, the chronological order in which the trace data was generated (which again may be indicated by the time tag), etc. The encrypted trace data may comprise, for example, any suitable number of trace data instances contained in any suitable number of trace messages that have been encrypted via the cryptographic circuitry 304.2.

The MCU 300 further comprises a data interface 306, which is configured to provide the encrypted data stored in the trace data buffer 304.3 (e.g. the encrypted trace data) to an external device, such as any of the receiving (e.g. host) devices as discussed herein. Thus, the data interface 306 may comprise hardware components, software components, or combinations of these to facilitate the transmission of any data stored in the trace data buffer 304.3 to a suitable external device using any suitable number and/or type of communication protocols. The data interface 306 may thus implement any suitable number and/or type of wired interconnections, ports, buffers, drivers, transmitters, receivers, etc. Some non-limiting examples of implementations of the data interface 306 may comprise those discussed above with respect to FIGS. 1A and 1B, such as a host system interface, a media access controller (MAC) Ethernet interface, a serial gigabit trace interface (SGBT), etc.

Thus, the encrypted data stored in the trace data buffer 304.3 may be transmitted in accordance with any suitable format, structure, and/or protocol, which may comprise standard communication protocols or non-standard communication protocols, in various embodiments. For each set of encrypted data (e.g. encrypted trace data such as the ciphertext and the authentication tag) that are transmitted in this way, the data interface 306 may transmit the encrypted data in any suitable manner such that the receiving device may receive all necessary data to decrypt and/or decode the contents thereof, e.g. the AAD and nonce values as discussed herein, per encrypted data transmission. In this way, for the MCU 300 as shown in FIG. 3A, the data interface 306 is configured to provide the encrypted trace data (and/or other suitable data stored in the trace data buffer 304.3) to the external device by reading the encrypted trace data (and/or other suitable data) from the trace data buffer 304.3, which is then transmitted to an external device as the secure data as shown in FIG. 3A.

Thus, the accelerator 304 facilitates the acceleration of cryptographic operations to be realized, which enables the trace data instances (and optionally other fields of the trace messages) to be encrypted on the fly. The resulting encrypted trace data, additional encrypted data, and/or unencrypted data, as the case may be, are transmitted through any suitable data interface to an external receiving device, as discussed herein.

The authenticated decryption process is described in further detail with respect to FIG. 5B for ease of explanation. FIG. 5B illustrates an example authenticated decryption block 504, in accordance with one or more embodiments of the present disclosure. The authenticated decryption block 504 may be identified with any suitable components implemented by the external device that receives the secure data transmitted by the MCU 300. Thus, the authenticated decryption block 504 receives the ciphertext C, authentication tag T, nonce value N, and AAD via communications received by the data interface 306. Again, the nonce value N and AAD, as well as the authentication tag T, may be passed in the clear, i.e. unencrypted. The authenticated decryption block 504 uses the secret key and the nonce value to decrypt the ciphertext C, as noted above, with the decrypted result being output as the original plaintext P that was encrypted by the cryptographic circuitry 304.2.

The authenticated decryption block 504 also uses the secret key K, which again may be stored locally on the external device or otherwise accessible by the external device, as well as the nonce value N, to generate a corresponding authentication tag T'. Because this process is identical to the one used by the authenticated encryption block 502 to generate the tag T, the authenticated decryption block 504 may thus authenticate the ciphertext C by verifying that the locally-generated tag T' matches the tag T transmitted by the authenticated encryption block 502 (i.e. the cryptographic circuitry 304.2). The authenticated decryption block 504 thus outputs an authentication indicator "T'=T" as shown in FIG. 5B, which may be a binary value (e.g. logical 0 or 1) or other suitable representation of the outcome of the authentication determination. In this way, the receiving device may not only decrypt the ciphertext (e.g. the encrypted trace data instances), but may also authenticate the source of the ciphertext (i.e. the MCU 300) as being authentic based upon the authentication indicator.

IV. Comparison of Secure Trace Data Architectures

FIG. 3B illustrates an example second secure trace data architecture, in accordance with one or more embodiments of the present disclosure. The secure trace data architecture as shown in FIG. 3B is associated with the MCU 350, which may operate in a similar manner as the MCU 300 as shown and discussed above with respect to FIG. 3A. Moreover, the MCU 300 and the MCU 350 may share several common components, which may operate in a similar or identical manner as one another. Thus, the same statements as provided above with respect to the operation and functionality of the MCU 300 also apply to the MCU 350, and therefore only differences between these components, their operation, and/or the operation of the MCUs 300, 350 are discussed in further detail below for purposes of brevity.

For example, like the MCU 300, the MCU 350 also comprises an accelerator 354, which includes debug circuitry 354.1, cryptographic circuitry 354.2 including an I/O manager 354.5, and a trace data buffer 354.3. Each of these components may operate in a similar or identical manner as their analogous counterparts as shown and discussed above for the accelerator 304 of FIG. 3A. That is, the debug circuitry 354.1 is configured to receive trace instances from the various trace sources 302 and to generate trace messages. However, in contrast to the operation of the MCU 300, the debug circuitry 354.1 stores the trace messages in the trace data buffer 354.3 in an unencrypted form prior to any of the data fields thereof being encrypted. For instance, the trace data buffer 354.3 may store any suitable data from the trace messages in an unencrypted form and in any suitable organized format or data structure. In an embodiment, the trace messages may be stored in the trace data buffer 354.3 as trace lines (tlines) in accordance with a predetermined data formatting.

Thus, the accelerator 354 of the MCU 350 also comprises cryptographic circuitry 354.2, which may perform the same type of symmetric encryption and authentication operations as discussed with respect to the MCU 300. However, the cryptographic circuitry 354.2 may perform these symmetric encryption and authentication operations upon a host device requesting such data (e.g. via the data interface 306). In other words, for the MCU 350 as shown in FIG. 3B, the cryptographic circuitry 354.2 is configured to perform authenticated encryption of the unencrypted data stored in the trace data buffer 354.3 (e.g. unencrypted trace data instances or other data values corresponding to the data fields of the trace messages) to generate the cryptographic output data.

This process, and the resulting cryptographic output data, may be identical to the processes as described above for the MCU 300, with the difference being that the encryption for the MCU 350 is performed after the trace messages are stored in the trace data buffer 354.3 instead of receiving the trace data messages directly from the debug circuitry 354.1. For example, in the same manner as described above for the MCU 300, the cryptographic circuitry 354.2 of the MCU 350 may facilitate this process by generating, for each of the stored trace data instances (or other data fields) on which the authenticated encryption is performed, a respective nonce value. Again, this nonce value is derived from the time stamp value corresponding to one or more of the trace messages containing the one or more trace data instances that are encrypted.

To do so, the cryptographic circuitry 354.2 is configured to read the stored trace messages from the trace data buffer 354.3 (e.g. the tlines) using a message parser 354.4. The message parser 354.4 is not needed for the architecture of the MCU 300, as the cryptographic circuitry 304.2 receives and performs the symmetric encryption and authentication as the trace data messages are provided by the debug circuitry 304.1. Thus, for the MCU 300, the debug circuitry 304.1 is configured to provide trace messages in accordance with a predetermined format, length, and structure that is recognized by the cryptographic circuitry 304.2.

The message parser 354.4 may thus be implemented as any suitable hardware, software, or combinations of these to emulate the generation of trace messages having the same predetermined format, structure, and length of the those that would be provided directly to the cryptographic circuitry 354.2 by the debug circuitry 354.1. For example, the message parser 354.4 may be configured to read and recognize tlines stored in the trace data buffer 354.3, and to format the data read in this manner into the same trace message format used by the debug circuitry 354.2 to generate trace messages.

The message parser 354.4 may thus be configured to identify the trace message data from the data stored in the trace data buffer 354.3, and to provide suitable parsing of trace messages to the cryptographic circuitry 354.2. The cryptographic circuitry 354.2, in turn, generates the encrypted trace data (or other encrypted data as discussed herein) in the same manner as if the trace messages were directly received via the debug circuitry 304.1, as discussed above with respect to the MCU 300 of FIG. 3A.

For example, the cryptographic circuitry 354.2 is configured to perform authenticated encryption of each of the one or more trace data incidents upon being read from the trace data buffer 354.3, e.g. via the message parser 354.4. Thus, the architectures of the MCUs 300, 350 may be alternatively implemented based upon the configuration and resources that may be available for a particular system. The MCU 300 may be better suited for applications in which continuous streaming of encrypted trace data to external devices is expected, whereas the MCU 350 may be better suited for applications in which the external device may only periodically request encrypted trace data.

The architecture of the MCU 350 may also be more suited to software implementations, as the trace messages may be stored in the trace data buffer 354.3 via the debug circuitry 354.1, which may include the various trace data instances as noted above. Thus, the processing circuitry 320 may execute the computer-readable instructions stored in the program memory 321 to perform the various functions of the accelerator 354 as discussed in further detail herein. In other words, the program memory 321 may store executable instructions represented as the accelerator control module 322 to facilitate a software implementation of the accelerator 354. Thus, when the instructions stored in the accelerator control module 322 are executed by the processing circuitry 320, any of the functionality described herein with respect to the accelerator 354 may be realized via software.

For example, when the instructions stored in the accelerator control module 322 are executed by the processing circuitry 320, the processing circuitry may access the stored trace data messages from the trace data buffer 354.3 in a similar manner as the trace messages are provided by the message parser 354.4. Moreover, the processing circuitry 320 may then perform any of the symmetric encryption and authentication functions as discussed herein on the trace data instances that are accessed from the trace data buffer 354.4. In other words, the processing circuitry 320 may perform any of the symmetric encryption and authentication functions that are otherwise implemented via the cryptographic circuitry 354.2 as discussed herein. Again, this may comprise using the time stamp values identified with the stored trace messages to generate a nonce value that is used to encrypt the trace data instances, which are then provided to the data interface 306 as the cryptographic output data.

VI. An Example Process Flow

Figure 6:
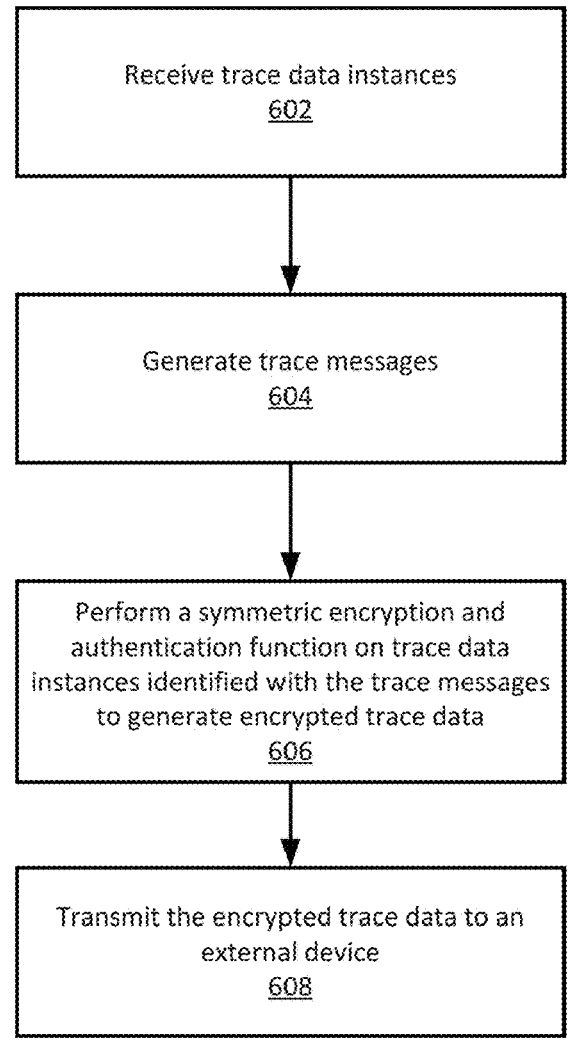
FIG. 6 illustrates an example process flow, in accordance with an embodiment of the disclosure.

FIG. 6 illustrates an example process flow, in accordance with an embodiment of the disclosure. With reference to FIG. 6, the process flow 600 may be a method executed by and/or otherwise associated with any suitable number and/or type of components such as one or more processors (processing circuitry), hardware components, executed instructions (e.g. software components) or combinations of these. The components may be associated with one or more components of the accelerators 304, 354 as discussed herein and/or one or more components of the MCUs 300, 350 as discussed herein. The flow 600 may include alternate or additional steps that are not shown in FIG. 6 for purposes of brevity, and may be performed in a different order than the steps shown in FIG. 6.

The process flow 600 may begin when one or more components receive (block 602) trace data instances. This may include, for example, the debug circuitry 304.1, 354.1 receiving the trace data instances from one or more of the trace sources 302, as noted above.

The process flow 600 may additionally include the one or more components generating (block 604) trace messages from the received trace instances. This may include, for example, the debug circuitry 304.1, 354.1 generating one or more trace messages as discussed above, with each trace message including a trace data instance. Again, one or more of the trace messages may be identified with a time stamp value.

The process flow 600 may additionally include the one or more components performing (block 606) a symmetric encryption and authentication function on one or more trace data instances that are identified with the generated trace messages to generate encrypted trace data. The symmetric encryption and authentication function may, for example, be performed on trace data instances that are directly received from the generated trace messages, as shown and discussed herein with respect to the MCU 300. Alternately, the symmetric encryption and authentication function may, for example, be performed on trace data instances that have been stored in a trace data buffer from the generated trace messages, and then subsequently received as trace messages provided by a message parser, as shown and discussed herein with respect to the MCU 350. In either case, the symmetric encryption and authentication function may be performed by first generating a nonce value using the time stamp that is identified with the one or more trace messages containing the one or more trace data instances that are encrypted.

The process flow 600 may additionally include the one or more components transmitting (block 608) the encrypted trace data to an external device as secure data. This may include, for example, transmitting the encrypted trace data to a suitable receiving device (e.g. a host device), together with other suitable data that may be used by the receiving device to decrypt and authenticate the encrypted trace data.

VI. Software Demonstration

FIG. 7 illustrates an example demonstration of a software flow solution to realize the functionality of the accelerator of FIG. 3B, in accordance with one or more embodiments of the present disclosure. The software flow solution as shown in FIG. 7 is provided to illustrate the feasibility of the functionality provided via the accelerator 354 as shown in FIG. 3B. The software flow solution as shown in FIG. 7 may be implemented, for example, using existing software tools such as the ChipCoach Library (CCL). Thus, FIG. 7 illustrates the feasibility of implementing the accelerator 354 as shown in FIG. 3B as the alternative software implementation. Again, for the hardware implementations of the accelerators 304, 354, the trace data is fed to the accelerator 304 before the trace data buffer (in FIG. 3A) or after the trace data buffer (in FIG. 3B).

As shown in FIG. 7, a set of trace data may be recorded into an OCTS file. An example of the recorded trace data in the present software flow example is shown in FIG. 8, which illustrates the TBUF content within an OCTS file. Using the CCL, the data can then be decoded and the trace messages reconstructed. Using a crypto library, the trace data is then fed into an AES-GCM crypto block and encrypted. For demonstration purposes, the TBUF is reconstructed as it can then be used as the input to the trace decoder. Once the trace messages are extracted, the trace data can be decrypted and displayed.

EXAMPLES

The techniques of this disclosure may also be described in the following examples.

Example 1. A microcontroller, comprising: debug circuitry configured to receive trace data instances associated with respective functions executed by the microcontroller and to generate trace messages, each one of the trace messages comprising a trace data instance and being identified with a time stamp value; cryptographic circuitry configured to perform authenticated encryption of the trace data instances included in the trace messages in accordance with a symmetric encryption and authentication function that utilizes a secret key and a number used only once (nonce) value to generate encrypted trace data, wherein the cryptographic circuitry performs the symmetric encryption and authentication function by generating, for one or more of the trace messages, a respective nonce value that is based upon a time stamp value corresponding to the one or more of the trace messages containing one or more trace data instances that are encrypted; and a data interface configured to provide the encrypted trace data to an external device.

Example 2. The microcontroller of Example 1, further comprising: a trace data buffer configured to store the encrypted trace data, wherein the data interface is configured to provide the encrypted trace data to the external device by reading the encrypted trace data from the trace data buffer.

Example 3. The microcontroller of any combination of Examples 1-2, further comprising: a trace data buffer configured to store the trace messages as unencrypted trace data, wherein the cryptographic circuitry is configured to perform authenticated encryption of trace data instances of the stored unencrypted trace data to generate the encrypted trace data by generating, for the trace data instances on which the authenticated encryption is performed, a respective nonce value that is based upon a time stamp value corresponding to the one or more of the trace messages containing the one or more trace data instances that are encrypted.

Example 4. The microcontroller of any combination of Examples 1-3, further comprising: a message parser configured to parse the trace messages to the cryptographic circuitry to generate the encrypted trace data.

Example 5. The microcontroller of any combination of Examples 1-4, wherein the cryptographic circuitry is configured to perform authenticated encryption of each of the one or more trace data incidents upon being read from the trace data buffer.

Example 6. The microcontroller of any combination of Examples 1-5, wherein: the secret key is from among a plurality of secret keys, the debug circuitry is configured to receive the trace data instances from a plurality of trace sources identified with the microcontroller, each one of the plurality of secret keys corresponds to a respective one of the plurality of trace sources, and the cryptographic circuitry is configured to perform the symmetric encryption and authentication function in accordance with one of the plurality of keys that corresponds to a respective one of the plurality of trace sources.

Example 7. The microcontroller of any combination of Examples 1-6, wherein the time stamp value comprises a first predetermined number of bits, and wherein the cryptographic circuitry is configured to generate, for the one or more of the trace messages, a respective nonce value by concatenating the first predetermined number of bits with a second predetermined number of bits having a predefined value.

Example 8. The microcontroller of any combination of Examples 1-7, wherein the symmetric encryption and authentication function corresponds to an authenticated-encryption Galois/Counter Mode (AES-GCM) mode of operation, and wherein a combined length of the first and the second predetermined number of bits corresponds to a nonce value bit length used in accordance with the AES-GCM mode of operation.

Example 9. The microcontroller of any combination of Examples 1-8, wherein two or more of the trace messages share a common time stamp value, and wherein the cryptographic circuitry is configured to perform authenticated encryption of the trace data instances included in the two or more of the trace messages by concatenating trace data instances included in the two or more of the trace messages, and to perform the authenticated encryption of the concatenated trace data instances in accordance with the symmetric encryption and authentication function by generating a respective nonce value that is based upon the common time stamp value.

Example 10. The microcontroller of any combination of Examples 1-9, wherein the cryptographic circuitry is configured to perform the authenticated encryption of the one or more trace data instances in accordance with the symmetric encryption and authentication function using additional authentication data (AAD) that comprises the time stamp value, and wherein the external device receives the AAD and reconstructs the nonce value from the time stamp value included in the AAD to decrypt the encrypted trace data.

Example 11. The microcontroller of any combination of Examples 1-10, wherein the one or more trace messages contain a core identifier value corresponding to a trace source associated with the one or more trace data instances contained in the one or more trace messages, and wherein the AAD further comprises the core identifier value.

Example 12. A non-transitory computer-readable medium having instructions stored thereon that, when executed by one or more processors, cause the one or more processors to: access, from a trace data buffer, stored trace messages, wherein the stored trace messages are based upon received trace data instances associated with respective functions executed by a microcontroller, and wherein each one of the stored trace messages comprises a trace data instance and is identified with a time stamp value; perform authenticated encryption of trace data instances included in the stored trace messages in accordance with a symmetric encryption and authentication function that utilizes a secret key and a number used only once (nonce) value to generate encrypted trace data, wherein the one or more processors perform the symmetric encryption and authentication function by generating, for one or more of the stored trace messages, a respective nonce value that is based upon a time stamp value corresponding to the one or more of the stored trace messages containing one or more trace data instances that are encrypted; and provide the encrypted trace data to an external device.

Example 13. The non-transitory computer-readable medium Example 12, wherein the instructions, when executed by the one or more processors, further cause the one or more processors to: perform authenticated encryption of trace data instances stored in the trace data buffer to generate the encrypted trace data by generating, for the trace data instances on which the authenticated encryption is performed, a respective nonce value that is based upon a time stamp value corresponding to the one or more of the stored trace messages containing the one or more trace data instances that are encrypted.

Example 14. The non-transitory computer-readable medium of any combination of Examples 12-13, wherein the instructions, when executed by the one or more processors, further cause the one or more processors to parse the stored trace messages to generate the encrypted trace data.

Example 15. The non-transitory computer-readable medium of any combination of Examples 12-14, wherein the instructions, when executed by the one or more processors, further cause the one or more processors to perform authenticated encryption of the one or more trace data incidents upon being read from the trace data buffer.

Example 16. The non-transitory computer-readable medium of any combination of Examples 12-15, wherein: the secret key is from among a plurality of secret keys, the trace data instances are received from a plurality of trace sources identified with the microcontroller, each one of the plurality of secret keys corresponds to a respective one of the plurality of trace sources, and the instructions, when executed by the one or more processors, further cause the one or more processors to perform the symmetric encryption and authentication function in accordance with one of the plurality of keys that corresponds to a respective one of the plurality of trace sources.

Example 17. The non-transitory computer-readable medium of any combination of Examples 12-16, wherein the time stamp value comprises a first predetermined number of bits, and wherein the instructions, when executed by the one or more processors, further cause the one or more processors to generate, for the one or more of the stored trace messages, a respective nonce value by concatenating the first predetermined number of bits with a second predetermined number of bits having a predefined value.

Example 18. The non-transitory computer-readable medium of any combination of Examples 12-17, wherein the symmetric encryption and authentication function corresponds to an authenticated-encryption Galois/Counter Mode (AES-GCM) mode of operation, and wherein a combined length of the first and the second predetermined number of bits corresponds to a nonce value bit length used in accordance with the AES-GCM mode of operation.

Example 19. The non-transitory computer-readable medium of any combination of Examples 12-18, wherein two or more of the trace messages share a common time stamp value, and wherein the instructions, when executed by the one or more processors, further cause the one or more processors to perform authenticated encryption of the trace data instances included in the two or more of the stored trace messages by concatenating trace data instances included in the two or more of the stored trace messages, to perform the authenticated encryption of the concatenating trace data instances in accordance with the symmetric encryption and authentication function by generating a respective nonce value that is based upon the common time stamp value.

Example 20. The non-transitory computer-readable medium of any combination of Examples 12-19, wherein the instructions, when executed by the one or more processors, further cause the one or more processors to perform authenticated encryption of the one or more trace data instances in accordance with the symmetric encryption function using additional authentication data (AAD) that comprises the time stamp value, and wherein the external device receives the AAD and reconstructs the nonce value from the time stamp value included in the AAD to decrypt the encrypted trace data.

Example 21. The non-transitory computer-readable medium of any combination of Examples 12-20, wherein the one or more trace messages contain a core identifier value corresponding to a trace source associated with the one or more trace data instances contained in the one or more stored trace messages, and wherein the AAD further comprises the core identifier value.

An apparatus as shown and described.

A method as shown and described.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore, the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A microcontroller, comprising:
debug circuitry configured to receive trace data instances associated with respective functions executed by the microcontroller and to generate trace messages, each one of the trace messages comprising a trace data instance and being identified with a time stamp value;
cryptographic circuitry configured to perform authenticated encryption of the trace data instances included in the trace messages in accordance with a symmetric encryption and authentication function that utilizes a secret key and a number used only once (nonce) value to generate encrypted trace data,
wherein the cryptographic circuitry performs the symmetric encryption and authentication function by generating, for one or more of the trace messages, a respective nonce value using a predetermined number of bits of the time stamp value,
wherein the time stamp value corresponds to the one or more of the trace messages containing one or more trace data instances that are encrypted; and
a data interface configured to provide the encrypted trace data to an external device.

2. The microcontroller of claim 1, further comprising:
a trace data buffer configured to store the encrypted trace data,
wherein the data interface is configured to provide the encrypted trace data to the external device by reading the encrypted trace data from the trace data buffer.

3. The microcontroller of claim 1, further comprising:
a trace data buffer configured to store the trace messages as unencrypted trace data,
wherein the cryptographic circuitry is configured to perform the authenticated encryption of the trace data instances to generate the encrypted trace data by generating, for the trace data instances on which the authenticated encryption is performed, a respective nonce value.

4. The microcontroller of claim 3, further comprising:
a message parser configured to parse the trace messages to the cryptographic circuitry to generate the encrypted trace data.

5. The microcontroller of claim 3, wherein the cryptographic circuitry is configured to perform the authenticated encryption of the one or more trace data instances upon being read from the trace data buffer.

6. The microcontroller of claim 1, wherein:
the secret key is from among a plurality of secret keys,
the debug circuitry is configured to receive the trace data instances from a plurality of trace sources identified with the microcontroller,
each one of the plurality of secret keys corresponds to a respective one of the plurality of trace sources, and
the cryptographic circuitry is configured to perform the symmetric encryption and authentication function in accordance with one of the plurality of keys that corresponds to a respective one of the plurality of trace sources.

7. The microcontroller of claim 1,
wherein the cryptographic circuitry is configured to generate, for the one or more of the trace messages, the respective nonce value by concatenating the predetermined number of bits of the time stamp value with a further predetermined number of bits having a predefined value.

8. The microcontroller of claim 7, wherein the symmetric encryption and authentication function corresponds to an authenticated-encryption Galois/Counter Mode (AES-GCM) mode of operation, and
wherein a combined length of the predetermined number of bits of the time stamp value and the further predetermined number of bits having the predefined value corresponds to a nonce value bit length used in accordance with the AES-GCM mode of operation.

9. The microcontroller of claim 1, wherein two or more of the trace messages share a common time stamp value, and
wherein the cryptographic circuitry is configured to concatenate the trace data instances included in the two or more of the trace messages, and to perform the authenticated encryption of the concatenated trace data instances in accordance with the symmetric encryption and authentication function by generating the respective nonce value based upon the common time stamp value.

10. The microcontroller of claim 1, wherein the cryptographic circuitry is configured to perform the authenticated encryption of the one or more trace data instances in accordance with the symmetric encryption and authentication function using additional authentication data (AAD) that comprises the time stamp value, and
wherein the AAD facilitates the external device to reconstruct the respective nonce value from the time stamp value included in the AAD to decrypt the encrypted trace data.

11. The microcontroller of claim 10, wherein the one or more trace messages contain a core identifier value corresponding to a trace source associated with the one or more trace data instances contained in the one or more trace messages, and
wherein the AAD further comprises the core identifier value.

12. A non-transitory computer-readable medium having instructions stored thereon that, when executed by one or more processors, cause the one or more processors to:
access, from a trace data buffer, stored trace messages,
wherein the stored trace messages are based upon received trace data instances associated with respective functions executed by a microcontroller, and
wherein each one of the stored trace messages comprises a trace data instance and is identified with a time stamp value;
perform authenticated encryption of trace data instances included in the stored trace messages in accordance with a symmetric encryption and authentication function that utilizes a secret key and a number used only once (nonce) value to generate encrypted trace data,
wherein the one or more processors perform the symmetric encryption and authentication function by generating, for one or more of the stored trace messages, a respective nonce value using a predetermined number of bits of the time stamp value,
wherein the time stamp value corresponds to the one or more of the stored trace messages containing one or more trace data instances that are encrypted; and
provide the encrypted trace data to an external device.

13. The non-transitory computer-readable medium of claim 12, wherein the trace data buffer is configured to store the trace messages as unencrypted trace data, and
wherein the instructions, when executed by the one or more processors, further cause the one or more processors to:
perform the authenticated encryption of trace data instances stored in the trace data buffer to generate the encrypted trace data by generating, for the trace data instances on which the authenticated encryption is performed, a respective nonce value.

14. The non-transitory computer-readable medium of claim 12, wherein the instructions, when executed by the one or more processors, further cause the one or more processors to parse the stored trace messages from the trace data buffer to generate the encrypted trace data.

15. The non-transitory computer-readable medium of claim 12, wherein the instructions, when executed by the one or more processors, further cause the one or more processors to perform the authenticated encryption of the one or more trace data incidents upon being read from the trace data buffer.

16. The non-transitory computer-readable medium of claim 12, wherein:
the secret key is from among a plurality of secret keys,
the trace data instances are received from a plurality of trace sources identified with the microcontroller,
each one of the plurality of secret keys corresponds to a respective one of the plurality of trace sources, and
the instructions, when executed by the one or more processors, further cause the one or more processors to perform the symmetric encryption and authentication function in accordance with one of the plurality of keys that corresponds to a respective one of the plurality of trace sources.

17. The non-transitory computer-readable medium of claim 12,
wherein the instructions, when executed by the one or more processors, further cause the one or more processors to generate, for the one or more of the stored trace messages, the respective nonce value by concatenating the predetermined number of bits of the time stamp value with a further predetermined number of bits having a predefined value.

18. The non-transitory computer-readable medium of claim 17, wherein the symmetric encryption and authentication function corresponds to an authenticated-encryption Galois/Counter Mode (AES-GCM) mode of operation, and
wherein a combined length of the predetermined number of bits of the time stamp value and the further predetermined number of bits having the predefined value corresponds to a nonce value bit length used in accordance with the AES-GCM mode of operation.

19. The non-transitory computer-readable medium of claim 12, wherein two or more of the trace messages share a common time stamp value, and
wherein the instructions, when executed by the one or more processors, further cause the one or more processors to concatenate the trace data instances included in the two or more of the stored trace messages, and to perform the authenticated encryption of the concatenating trace data instances in accordance with the symmetric encryption and authentication function by generating the respective nonce value that is based upon the common time stamp value.

20. The non-transitory computer-readable medium of claim 12, wherein the instructions, when executed by the one or more processors, further cause the one or more processors to perform the authenticated encryption of the one or more trace data instances in accordance with the symmetric encryption function using additional authentication data (AAD) that comprises the time stamp value, and
wherein the AAD facilitates the external device to reconstruct the respective nonce value from the time stamp value included in the AAD to decrypt the encrypted trace data.

21. The non-transitory computer-readable medium of claim 20, wherein the one or more trace messages contain a core identifier value corresponding to a trace source associated with the one or more trace data instances contained in the one or more stored trace messages, and
wherein the AAD further comprises the core identifier value.

* * * * *